United States Patent [19]

Karning et al.

[11] Patent Number: 4,677,637

[45] Date of Patent: Jun. 30, 1987

[54] TE LASER AMPLIFIER

[76] Inventors: Heinrich Karning, Albert-Fritz-Str. 6, D-6900 Heidelberg; Franz Prein, Tulpenweg 3, D-6901 Waldhilsbach; Karl-Heinz Vierling, Johann-Sebastian-Bach-Str. 46, D-6901 Bammental, all of Fed. Rep. of Germany

[21] Appl. No.: 833,502

[22] Filed: Feb. 20, 1986

Related U.S. Application Data

[63] Continuation of Ser. No. 608,924, May 11, 1984, abandoned, which is a continuation of Ser. No. 322,860, Nov. 19, 1981, abandoned.

[30] Foreign Application Priority Data

Nov. 22, 1980 [DE] Fed. Rep. of Germany ....... 3044023
Sep. 24, 1981 [DE] Fed. Rep. of Germany ....... 1107599

[51] Int. Cl.$^4$ ............................. H01S 3/03; H01S 3/97
[52] U.S. Cl. .......................................... 372/83; 372/81; 372/86; 372/87; 372/93; 372/37
[58] Field of Search ....................... 372/81, 83, 86, 87, 372/55, 37, 93

[56] References Cited

U.S. PATENT DOCUMENTS 4,150,343 4/1979 Seelig et al. ........................... 372/38
4,367,553 1/1983 Neracher ............................. 372/83

FOREIGN PATENT DOCUMENTS 0001032 3/1979 European Pat. Off. .
2033825 12/1972 Fed. Rep. of Germany .
2919709 11/1980 Fed. Rep. of Germany ........ 372/87
0147593 4/1981 Fed. Rep. of Germany ........ 372/87
2035674 6/1980 United Kingdom .

OTHER PUBLICATIONS

Lachambre et al., "Simultaneous Frequency Stabilization and Injection in a TEA—$CO_2$ Oscillator", *Applied Optics*, vol. 17, No. 7, 1 Apr. 1978, pp. 1015–1017.
Foster, "High Power $CO_2$ Lasers—A Review", *Optics and Laser Technology*, Jun. 1972, pp. 121–128.

*Primary Examiner*—James W. Davie
*Attorney, Agent, or Firm*—Handal & Morofsky

[57] ABSTRACT

A TE laser amplifier has a fully closed metal housing. This fact, its geometry, and that of its electrodes (5-7) and/or the reversal of the output polarity make possible a homogenous field distribution, a capability to influence the local amplification process in the laser medium, and a relatively long lifetime of the gas and the laser.

13 Claims, 13 Drawing Figures

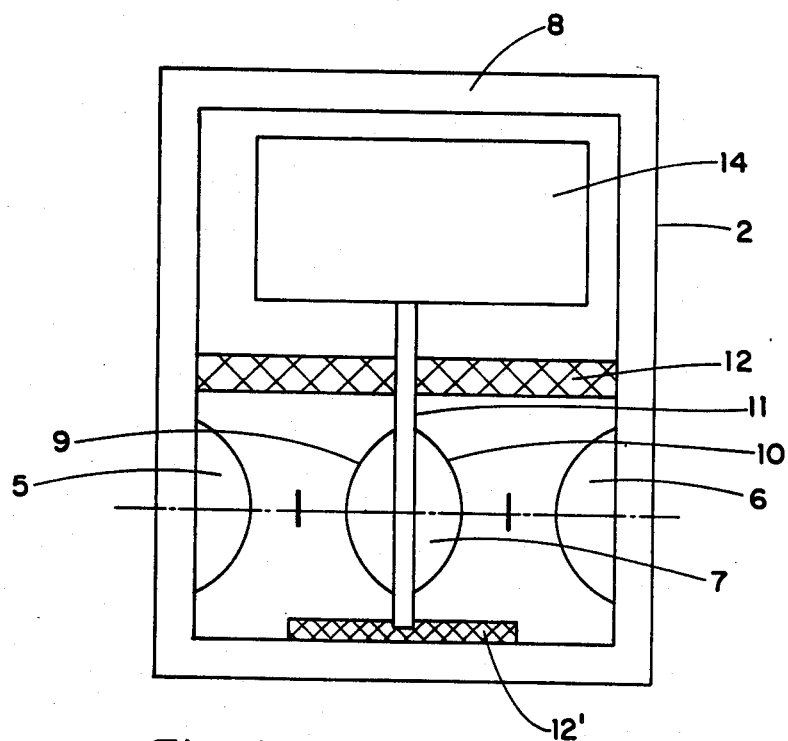
Fig. 4
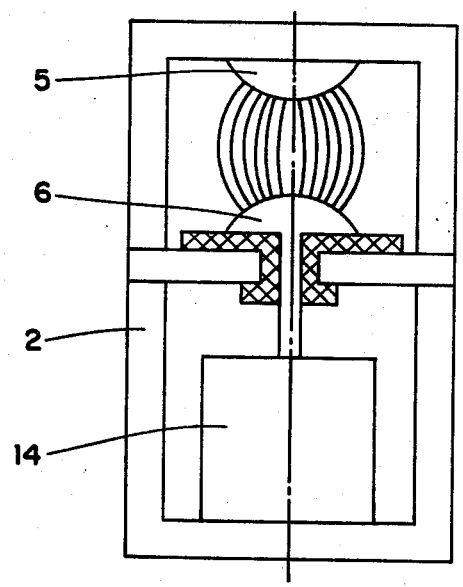 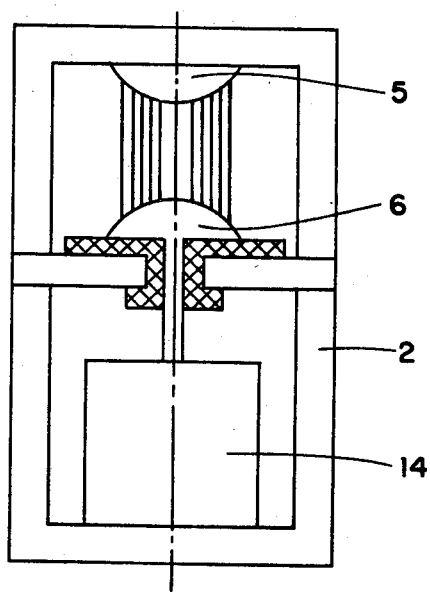
Fig. 5     Fig. 6

TE LASER AMPLIFIER

CROSS REFERENCE TO RELATED APPLICATION

This application is a continuation of U.S. patent application Ser. No. 06/608,924 filed May 11, 1984, now abandoned, which, in turn, is a continuation of U.S. patent application Ser. No. 06/322,860 filed Nov. 19, 1981 now abandoned, all filed in the names of the inventors herein.

BACKGROUND ART

The invention relates to a TE (transverse excitation) laser amplifier of substantially symmetric construction and symmetric discharge current distribution. The amplifier consists of a system of electrodes lying in, for example, a gas stream and having at least two mutually opposite discharge surfaces. The system of electrodes has a high-voltage connection leading outside of the housing and is located in the resonance or discharge chamber of the housing. During laser operation, this chamber has mirrors at one of its end faces that reflect the laser beam in the direction of the other end face and cooperate with partially transparent mirrors fastened in the region of the other end face. During amplifier operation, the mirrors are replaced by terminal windows that permit passage of the amplified laser radiation. The mirrors and the windows are located in the free space between the electrodes.

Laser amplifiers of this type are described in DE Offenlegungsschrift No. 27 53 304 and European Pat. No. 0 001 032. However, these laser amplifiers, while otherwise usable, have a housing made of glass, ceramic or quartz which are materials that are not easy to work with during fabrication. GB Pat. No. 1 301 207 also describes a similar laser.

SUMMARY OF THE INVENTION

It is the object of the present invention to increase the lifetime and the power-per-volume of a laser amplifier of the type described above. This object is attained, according to the invention, in that the housing may be, by way of example, a cylindrical metal body (Faraday cage) that is fully closed with respect to the housing except for the high-voltage supply line and its insulator and except for the laser beam inlet and outlet. Metal housings of this kind can be produced easily to withstand high pressures. Moreover, it is possible to achieve a homogeneous field distribution and good heat transfer, resulting in a prolonged life of the gas. Furthermore, metal is only minutely permeable to gas and can be degassed easily. As a result, gas needs to be admitted only once during the manufacture of the laser amplifier; no further exchange of gas takes place at a later time so that a housing of this kind is especially suitable for so-called sealed-off operation. In addition, metal housings are very sturdy and suitable for long-term operation.

BRIEF DESCRIPTION OF THE DRAWINGS

Exemplary embodiments of the invention are explained below with the aid of the following drawings in which similar parts of different figures carry the same reference character.

FIG. 4 is an embodiment as in FIG. 3 with built-in high-voltage generator;

FIG. 5 is a cross section similar to that of FIG. 2, in which the electric field lines emerging from the cathode are curved;

FIG. 6 is a cross section as in FIG. 5, in which the field lines emerging from the cathode are substantially parallel.

DETAILED DESCRIPTION OF THE DRAWINGS

Figure 1:
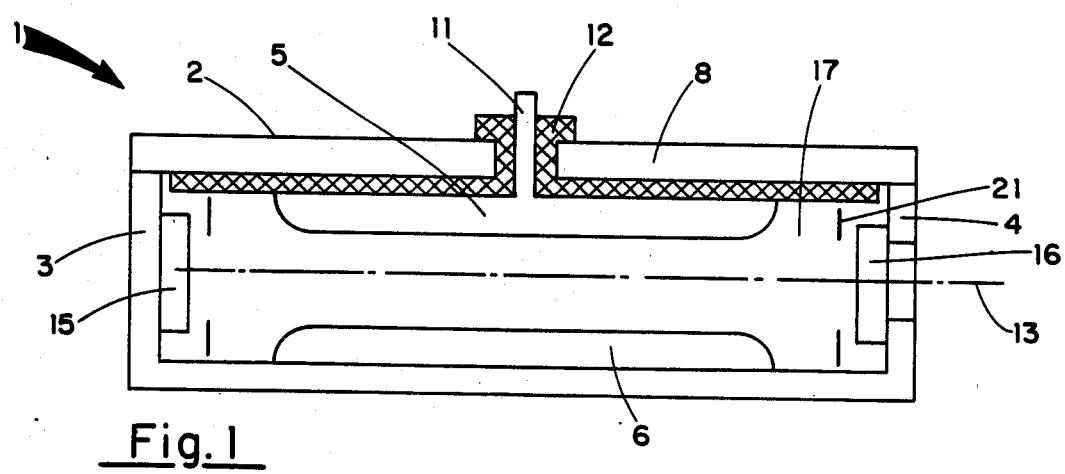
FIG. 1 is a longitudinal section through a substantially symmetrically constructed laser amplifier of elongated construction.
Figure 2:
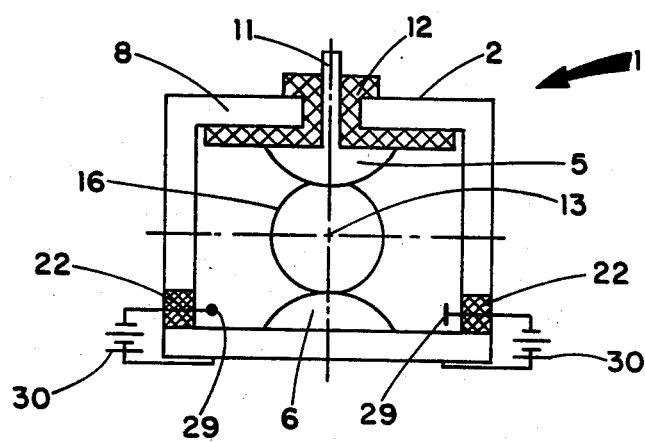
FIG. 2 is a cross section of the embodiment of FIG. 1 with two additional auxiliary electrodes.

FIGS. 1 and 2 are schematic sketches illustrating the principle of an extended TE laser amplifier 1, having a housing 2 consisting of a symmetric, hollow body made of metal, e.g. a non-magnetic metal such as aluminum, copper, tungsten or an alloy thereof or of a ferro-magnetic metal. The hollow body is substantially cylindrical and includes an electrode 6 attached to the bottom and an electrode 6 attached to the cover 8 or otherwise made integral therewith. As can be seen in FIG. 2 the cross section of housing 2 can be rectangular in shape. In other embodiments the cross section may be circular, square, or only substantially rectangular. It is possible to provide at least one other electrode 29 (see FIG. 2) within the gas volume but external to the discharge region. These so-called auxiliary electrodes are embodied as plates, wire, braid, foil or as perforated sheets and are connected to one pole of a voltage source 30, e.g. a battery, via an insulating feedthrough 22. The other pole of the voltage source is connected to the housing 2. This arrangement permits the removal of ions from the gas volume, which insures the contained purity of the gas. FIGS. 1 and 2 also show the high-voltage supply line 11 and the insulator device 12 which insulates the high-voltage line 11 and the electrode 5 from the other parts of the housing. It would be possible, however, to freely suspend the high-voltage electrode 5 within the metal housing 2. The actual gas discharge is initiated and stabilized by per se known methods with the aid of trigger wires (Lambert-Pearson method), so-called corona slicing, surface discharges, by UV-pre-ionization or with the aid of spark gaps. The trigger pulse required for this process has a typical half-wave duration of less than 100 nsec and a leading edge of, typically, less than 20 nsec. This fast-rising leading edge initiates the gaseous discharge due to the high voltage applied by the electrode 11.

A 100% reflecting mirror 15 is mounted on the optical axis at the left interior endface of the housing as seen in the figure, while the mirror 16, partially transparent to the radiation, is mounted at the right interior endface 4. While not shown in the drawing, the mirror 15 may be embodied as a retro-mirror system; either of these mirrors may be made integral with the endfaces or may constitute the endfaces.

The width of the electrodes is between a few millimeters and centimeters. For example, the electrodes 5 and 6 may be on the order of 2 cm. in width and, for example, the ratio of the widths being on the order of 4:5. The length of the electrodes is one or more tens of centimeters, e.g., 10 cm. The distance between electrodes varies with the voltage and lies on the order of magnitude of a few millimeters to a few centimeters, the associated voltage typically being about 30 kV. This results in field strengths of 10 to 25 kV/cm. When the laser is operated with these values, an energy density of 0.1 to 0.5, for example, 0.25 joule/cm$^3$ is obtained. A high voltage is applied to the electrodes along supply line 11. An electrical discharge is carried out in the gas between the two electrodes, resulting in excitation of the $CO_2$ gas molecules. Subsequently, optical energy can be coupled out of the housing 2 by means of the resonator system (mirrors 15, 16).

By way of example, a discharge volume of 20 cm$^3$, was pumped with 5 joules of energy, corresponding to an energy density of 0.25 joule/cm$^3$ and, from this volume of a standard gas mixture of nitrogen, carbon dioxide and helium in the ratios 1:1:8, respectively, 0.25 joule of energy was coupled out with the use of an 80% exit mirror.

The described discharge geometry results in a particularly favorable ratio of excited laser volume to the volume actually utilized optically. These values given in this specification apply only to atmospheric pressure and are correspondingly changed for other pressure conditions.

Figure 3:
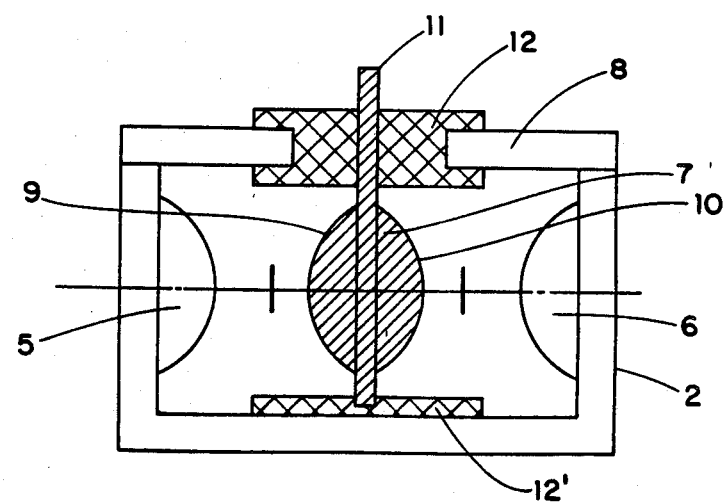
FIG. 3 is a cross section of an embodiment similar to that of FIG. 1 but with a double laser arrangement.
Figure 7:
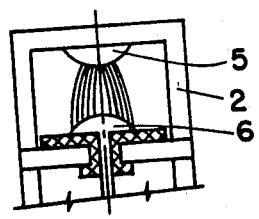
FIG. 7 illustrates the electric field lines when the anode and cathode have the same diameter.

By comparison therewith, FIG. 3 further shows a central electrode 7, disposed along the longitudinal axis of the housing 2 having discharge surfaces 9, 10 that lie opposite the electrodes 5, 6 respectively. Of course, the beam could be folded, once or several times, resulting in a corresponding shortening of the overall construction. The central electrode 7 is rigidly fixed relative to the cover 8 and the electrodes 5 and 6 are attached to the side walls of the housing 2. In another embodiment, not shown, the electrodes 5, 6 might be attached to the cover 8 while the central electrode, if present, would be attached to, or made integral with, the internal housing bottom or one of the side walls. One of the electrodes must be insulated with respect to the other parts of the housing; in the present case, it is the central electrode 7 which is insulated by means of the insulators 12, 12'. If the high-voltage supply line 11 does not extend beyond the central electrode, the insulator 12' is not needed.

FIG. 4 is merely a variant of the embodiment of FIG. 3, in which the insulator 12 and the cover 8 have been separated. In this case, the insulator 12 extends to the side walls of the housing 2, thus dividing the Faraday cage and permitting the presence of the high-voltage pulse generator 14. If necessary, the high-voltage supply line 11 and the central electrode 7 of the embodiments of FIGS. 3 and 4 can be made of a single piece of material as suggested by the hatching in FIG. 3. In another exemplary embodiment, not shown, the housing 2 could include a cooling device, e.g. communicating with the resonator or discharge volume 17 (FIG. 1) through a gas conduit. An apparatus of this kind is then operated in so-called flowing or recirculating mode, described in greater detail, for example, in DE Offenlegungsschrift No. 27 53 304.

The cover 8 is attached with bolts to the part of the housing which faces it, i.e., the tub, and is sealed with a gasket subsequent to filling the housing 2 with gas by methods known from vacuum technology. Other methods of closure are possible, for example, by means of adhesives, soldering or electron welding. Housings with circular cross section are also conceivable.

FIGS. 5 and 6 illustrate possibilities for improving the gas discharge of the compact laser described above by various methods of influencing the field and for obtaining various degrees of amplification. For example, the plasma generated by the gas discharge, whose cross section should be as large as necessary in the direction of the radiation but as small as possible, is influenced by affecting the magnetic and electric fields for given conditions of voltage, pressure and resonator geometry relative to the mode diaphragm 21 (FIG. 1). In FIG. 5, the field lines are relatively widely separated in the region adjacent to the cathode 6, whereas, after the polarity of the excitation voltage has been reversed, and as shown in FIG. 6, the field lines emerge almost parallel (homogeneous). This is due to the fact, among others, that, during the build-up of a discharge, the direction of the emerging field lines cannot be substantially changed. The polarity of the excitation voltage is reversed in order to control the amplification process in the amplifying medium and this process is used for mode selection. The overall result is that the plasma has a well-defined homogeneous character and the stimulation densities are substantially constant.

By way of example, using the structure of FIG. 6, with the above-cited ratio of widths of 4:5, the discharge geometry is changed, in FIG. 5 with electrode 6 as the cathode and in the case of FIG. 6 with electrode 5 as the cathode. When the voltage pulse is triggered at electrode 6, an initial auxiliary discharge takes place because electrode 6 is separated from the ground potential of the housing 2 by dielectric material (shown hatched). The effect of this insulation is that the discharge expands to a greater volume. In the case of FIG. 6, no expansion takes place because the electrode 5 lies directly at ground potential. The discharge is further condensed only due to the magnetic effect of the current flow.

Figure 8:
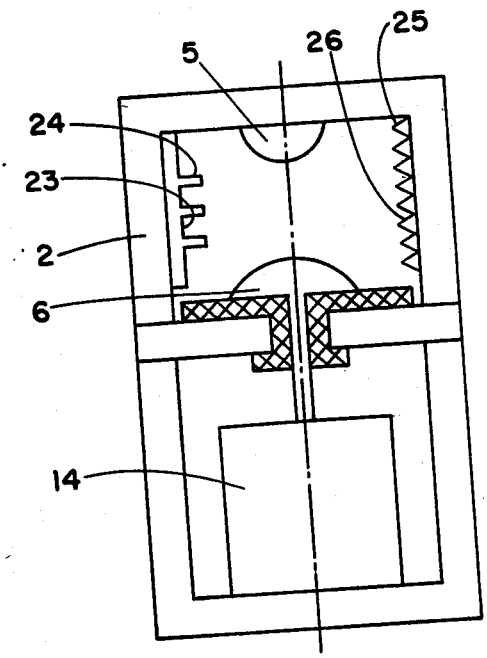
FIG. 8 is a cross section as in FIG. 5 in which the anode has a small diameter and the cathode has a larger diameter and including lateral mechanical means for influencing the potential field.
Figure 9:
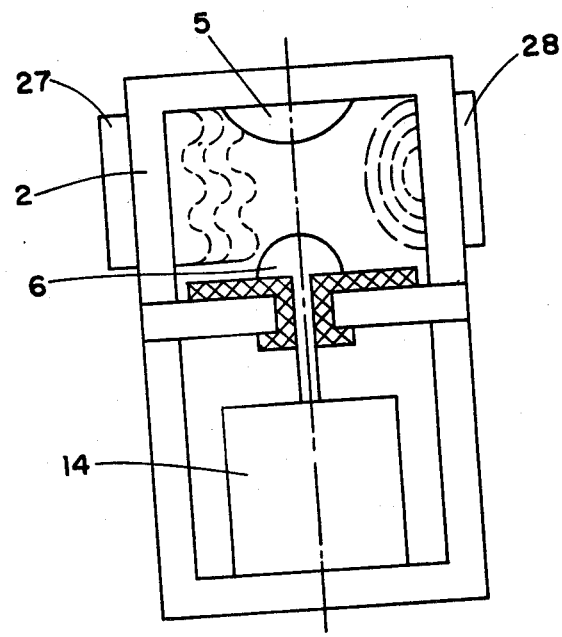
FIG. 9 is a cross section as in FIGS. 6 or 8 with an anode of large diameter and a cathode of smaller diameter and including lateral magnetic means for influencing the potential field.

This effect can be enhanced by a number of steps, illustrated in FIGS. 7 to 13. For example, the different field line patterns at the anode and cathode in FIG. 7 can be equalized by different cross sections of the anode 5 and the cathode 6. Both of these electrodes have per se known cross sectional profiles, e.g., Rogowski, Chang, or other profiles. FIG. 8 shows that the cross section of the anode is smaller than that of the associated cathode, whereas the situation is reversed in FIG. 9. Moreover, in these examples, various means for influencing the electric potential (the electric field lines) are provided at the longitudinal walls of the housing 2. In FIG. 8, these means are plates 23 and wires 24 on the left, as seen in the figure, and points 25 and edges 26 on the right. In FIG. 9, these means are embodied as permanent or electro-magnets 27, 28.

Figure 10:
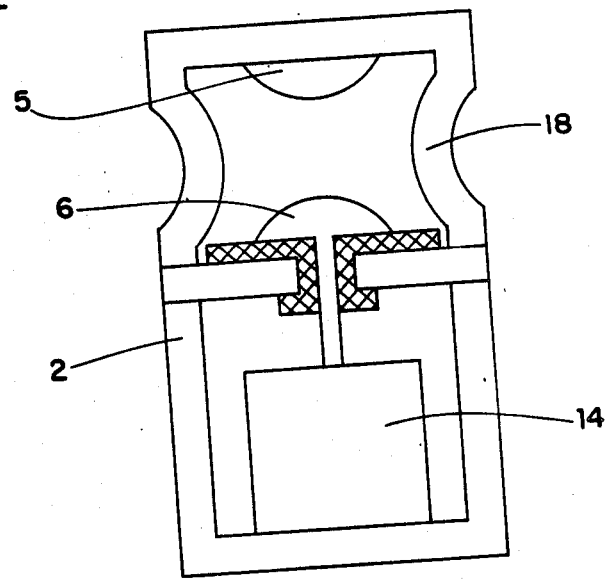
FIG. 10 is a cross section as in FIGS. 5 and 6 including a narrowing of the longitudinal housing walls in the region between the electrodes.
Figure 11:
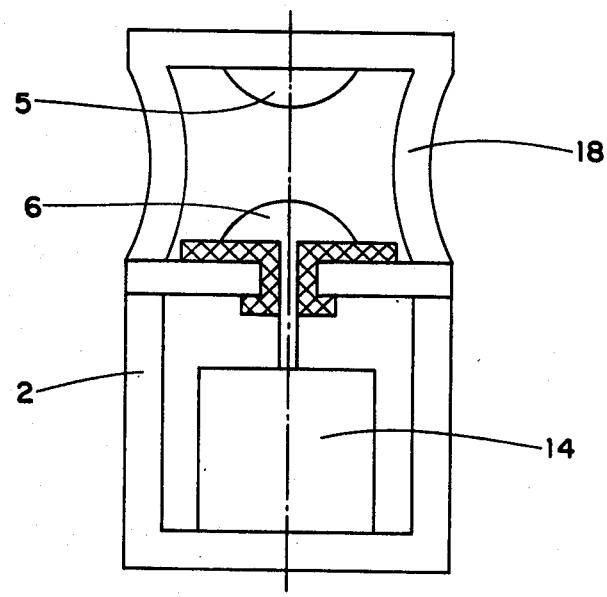
FIG. 11 shows a narrowing as in FIG. 10, the cross section of which extends over the entire height of the longitudinal wall.
Figure 12:
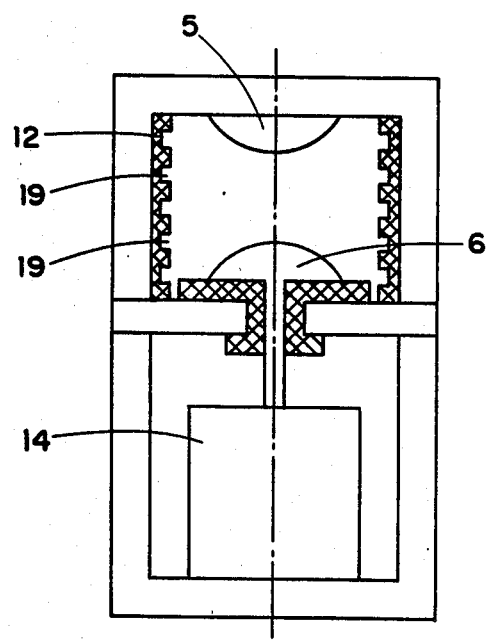
FIG. 12 illustrates an interior cladding of the housing with longitudinal, parallel grooves.
Figure 13:
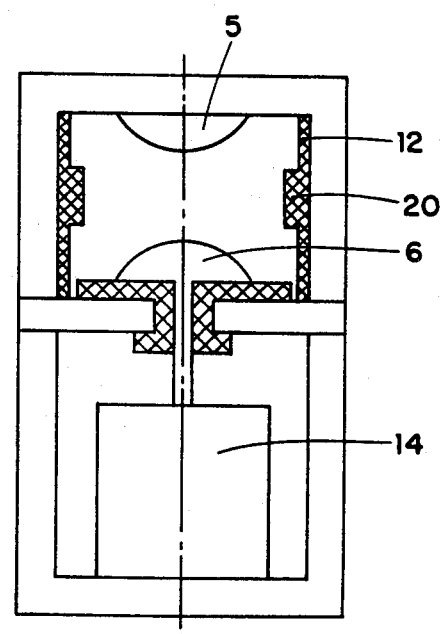
FIG. 13 illustrates an interior cladding of the housing with a bulge which extends in the central region between the electrodes, in the longitudinal direction.

The direction and density of the field lines can also be determined by constructing the housing 2, which carries the discharge current, of magnetizable material, for example, as shown in FIGS. 10 and 11. There, both of the longitudinal walls of the housing 2 exhibit a narrowing 18 along an axis perpendicular to the axis of electrodes 5 and 6. For example, as in FIG. 10, each bulge may have an approximately semi-circular cross section strictly confined to the region between the electrodes so as to influence stray fields directly. In FIG. 11, on the other hand, the narrowed cross section is shallower and extends over the entire height of the wall chamber. Here too, the electrodes may have different cross sections, as in FIGS. 8 and 9.

In all of the exemplary embodiments described above, undesirable surface discharges on the cladding are prevented. The cladding may consist, for example, of dielectric or semi-conducting layers of definite conductivity, e.g., made of germanium or silicon. These layers 12, 12' may have smooth surfaces, as shown in FIGS. 1–4, or their surfaces may have parallel longitudinal grooves 19, as in the example of FIG. 12, with a meandering cross section, as shown in the drawing. Finally, in the example of FIG. 13, a bulge 20, disposed parallel to the axis of electrodes 5,6 and positioned lateral to the free space between the electrodes 5, 6 is attached to the otherwise smooth layer 12.

It should be understood that other cross-sectional shapes of the electrodes 6–7, narrowings 18, grooves 19 and bulges 20 are possible in other exemplary embodiments, not shown in the drawing, without departing from the scope of the invention.

If the TE laser is not used as a transmitter, but as an amplifier, then the mirrors 15 and 16 (FIGS. 1 and 2) must be replaced by end-closing windows that are transparent to the given radiation. Immediately after the discharge has taken place between the electrodes, a pulse having usually a well-defined radiation profile and low power is injected through one of the windows. The total pulse emerging from the other window of the housing is then amplified by approximately 3 to 10%.

What is claimed is:
1. A transversely excited laser amplifier, comprising:
   (a) a housing made of metal terminated at the ends by first and second endfaces and defining an enclosed chamber;
   (b) first and second electrodes disposed substantially parallel to the longitudinal axis of said housing, disposed inside said chamber, and having mutually confronting discharge surfaces;
   (c) a high-voltage supply incorporating a feedthrough supply line and a first insulator interposed between said housing and said high-voltage supply line leading from the space outside said housing into said chamber and electrically to said first electrode;
   (d) first optical means associated with one of said endfaces for reflecting radiation and second optical means associated with the other of said endfaces for reflecting radiation and for permitting passage of radiation;
   (e) a laser medium contained within said chamber; and
   (f) field influencing means for electrically or electromagnetically controlling the field intensity profile generated by said first and second electrodes, said field influencing means being disposed on the opposing longitudinal walls to which said first and second electrodes are attached.

2. A laser amplifier as in claim 1, wherein said housing has a substantially rectangular cross section.

3. A laser amplifier as in claim 1, wherein said housing consists of a metal taken from the group consisting of non-magnetic metals, non-magnetic metal alloys, and ferro-magnetic metals.

4. A laser amplifier as in claim 2, wherein each of said first and second electrodes is attached to one of a pair of opposing longitudinal walls of said housing, respectively.

5. A laser amplifier as in claim 2, wherein each of said first and second electrodes is integral with one of a pair of longitudinal walls of said housing, respectively.

6. A laser amplifier as in claim 1, wherein said means for electromagnetically influencing the field intensity profile is made of a material taken from the group consisting of metals, semiconductors, insulators with partially conducting surfaces, or magnets.

7. A laser amplifier as in claim 1, wherein said housing has a cross section comprising a pair of parallel walls, to which said first and second electrodes, respectively, are rigidly attached, and a pair of curved walls joining the respective ends of said parallel walls, said curved walls having convex inner surfaces, whereby the field intensity profile is controlled.

8. A laser amplifier as in claim 4, further comprising cladding disposed on the opposing longitudinal walls perpendicular to said longitudinal walls to which said first and second electrodes are attached, wherein said cladding is made of material taken from the group consisting of dielectric materials and semiconducting materials, whereby the field intensity profile is controlled.

9. A laser amplifier as in claim 8, wherein said cladding is configured to have at least one projection extending in a direction substantially parallel to said longitudinal axis.

10. A laser amplifier as in claim 1, further comprising cladding disposed on the opposing longitudinal walls perpendicular to said longitudinal walls to which said first and second electrodes are attached, wherein said cladding is made of a material taken from the group consisting of dielectric materials and semiconducting materials, whereby the field intensity profile is controlled.

11. A laser amplifier as in claim 10, wherein said cladding is configured to have at least one projection extending in a direction substantially parallel to said longitudinal axis.

12. A laser amplifier as in claim 4, wherein said housing has a cross section comprising a pair of substantially parallel walls, to which said first and second electrodes, respectively, are rigidly attached, and a pair of curved walls joining the respective ends of said parallel walls, said curved walls having convex inner surfaces, whereby the field intensity profile is controlled.

13. A transversely excited laser amplifier comprising:
   (a) a housing made of metal terminated at its ends by first and second endfaces and defining an enclosed chamber;
   (b) first and second electrodes disposed substantially parallel to the longitudinal axis of said housing, said first and second electrodes being disposed inside said chamber, and having mutually confronting discharge surfaces;

(c) a high-voltage supply incorporating a feed-through supply line and a first insulator interposed between said housing and said high-voltage supply line, said high voltage supply line leading from the space outside said housing into said chamber and being electrically connected to said first electrode;

(d) optical means incorporated in said endfaces the first of which for reflecting radiation and the second of said means for permitting passage of radiation of a predetermined wavelength;

(e) a laser medium contained within said chamber;

(f) field influencing means for electrically or electromagnetically controlling the field intensity profile generated by said first and second electrodes; said field influencing means being disposed on the opposing longitudinal walls to which said first and second electrodes are attached, and (g) at least one auxiliary electrode disposed within said laser medium and positioned outside the discharge region defined by said confronting first and second electrodes.

* * * * *